United States Patent [19]
Matsumoto

[11] 3,904,918
[45] Sept. 9, 1975

[54] DYNAMIC CONVERGENCE CORRECTION DEVICE

[75] Inventor: Shuzo Matsumoto, Yokohama, Japan

[73] Assignee: Hitachi, Ltd., Japan

[22] Filed: Aug. 14, 1973

[21] Appl. No.: 388,275

[30] Foreign Application Priority Data

Aug. 14, 1972 Japan .............................. 47-80773

[52] U.S. Cl. ............................ 315/13 C; 315/371
[51] Int. Cl.[2] ........................................ H01J 29/50
[58] Field of Search ........... 315/13 C, 276 D, 27 R, 315/28, 29, 13 R, 370, 371

[56] References Cited

UNITED STATES PATENTS

| | | | |
|---|---|---|---|
| 3,440,479 | 4/1969 | Brockmann | 315/13 C |
| 3,740,611 | 6/1973 | Slavik | 315/27.6 D |
| 3,786,300 | 1/1974 | Hill | 315/276 D |
| 3,798,496 | 3/1974 | Koubek | 315/276 D |

*Primary Examiner*—Richard A. Farley
*Assistant Examiner*—J. M. Potenza
*Attorney, Agent, or Firm*—Craig & Antonelli

[57] ABSTRACT

A dynamic convergence correction device is disclosed which comprises a first saw-tooth voltage generator for horizontal cycles, a second saw-tooth voltage generator for vertical cycles, first and second waveform correction circuits which each cuts off voltages in a predetermined range and passes the other voltages to correct a saw-tooth voltage into a waveform having a dead zone, and a balanced modulator having first and second input and output terminals. The first and second waveform correction circuits each have a couple of diodes connected in parallel in opposite polarities. The saw-tooth voltage for horizontal cycles is applied to the first waveform correction circuit, whereby it is corrected into a waveform with a dead zone and then applied to the first input terminal of the balanced modulator, whereas the saw-tooth voltage for vertical cycles is applied to the second waveform correction circuit, whereby it is corrected into a saw-tooth waveform with a dead zone and then applied to the second input terminal of the balanced modulator, so that the modulated output voltage from the balanced modulator is utilized for dynamic convergence.

7 Claims, 8 Drawing Figures

DYNAMIC CONVERGENCE CORRECTION DEVICE

The present invention relates to a dynamic convergence correction circuit for the color television receiver, or more in particular to a dynamic convergence correction device capable of superior dynamic convergence at the four corners of the screen of the color television receiver.

In the conventional method of dynamic convergence, parabola current in synchronism with horizontal cycles is supplied to the horizontal convergence coil, while parabola current in synchronism with vertical cycles is supplied to the vertical convergence coil.

In other words, the conventional dynamic convergence correction device is such that on the screen of a color television receiver as shown in FIG. 1, correction of horizontal and vertical convergences is effected along lines X—X' and Y—Y' respectively and then they are combined for correction at the four corners. In the case of the 110° deflection type cathode-ray tube, however, misconvergence prior to correction is so great and the shape of misconvergence so complex that even though the use of a convergence correction device enables electron beams from the three electron guns to be successfully converged at the four corners, residual misconvergence of red and green staggerring lines shown by solid and dashed lines respectively in FIG. 1 occurs at such positions slightly inwardly of the four corners of the screen.

If this residual misconvergence is to be eliminated, it is necessary to supply correction current of complicated shape to the horizontal and vertical convergence coils, which in turn requires a very expensive circuit arrangement.

On the other hand, when the above-mentioned convergence correction device is used with the 110° deflection type cathode-ray tube incorporating the recently-developed deflection yoke which alters the magnetic field of the prior art cathode-ray tube, the correction along lines X—X' and Y—Y' causes residual misconvergence to occur at the four corners of the screen as shown in FIG. 2, where the solid and dashed lines represent red and green lines respectively.

In order to remove the residual misconvergence shown in FIG. 2, the correction currents as shown in FIGS. 3 and 4 are required for correction along lines A-C (direction of vertical scanning) and A-B (direction of horizontal scanning) respectively for red beam, whereas correction currents with phases different by 180° from those of FIGS. 3 and 4 are required for green beam. By the way, symbols $T_V$ and $T_H$ in FIGS. 3 and 4 denote vertical and horizontal cycles respectively.

More in detail, the correction current required for red beam, for example, comprises the current shown in FIG. 5 which is the result of balancing and modulating the saw-tooth current for vertical cycles with a dead zone as shown in FIG. 3, by the saw-tooth current for horizontal cycles with a dead zone as shown in FIG. 4. It is, however, difficult to obtain a circuit capable of producing the currents shown in FIGS. 3 and 4.

Accordingly, it is an object of the present invention to provide a low-cost dynamic convergence device with a simple circuit arrangement.

Another object of the invention is to provide a waveform correction circuit suitably applied to the dynamic convergence device according to the invention for correcting a waveform to produce a saw-tooth current or voltage having a waveform with a dead zone.

A further object of the invention is to provide a dynamic convergence circuit incorporating a waveform correction circuit for producing a saw-tooth current or voltage having a dead zone.

According to one aspect of the present invention, there is provided a dynamic convergence correction device comprising a first generator for generating a saw-tooth voltage for horizontal cycles, a second generator for generating a saw-tooth voltage for vertical cycles, first and second waveform correction circuits for respectively cutting off voltages in the respective predetermined ranges and passing the other voltages to connect the saw-tooth voltages for horizontal and vertical cycles into the respective waveforms each having a dead zone, a balanced modulator having first and second input terminals and an output terminal, means for connecting said first generator to said first input terminal of said balanced modulator through said first waveform correction circuit to supply to said first input terminal of said balanced modulator the saw-tooth voltage for horizontal cycles having a dead zone, means for connecting said second generator to said second input terminal of said balanced modulator through said second waveform correction circuit to supply to said second input terminal of said balanced modulator the saw-tooth voltage for vertical cycles having a dead zone, and means for drawing out from said output terminal of said balanced modulator an output in which the saw-tooth voltage for horizontal cycles having a dead zone is modulated by the saw-tooth voltage for vertical cycles having a dead zone.

The above and other objects, features and advantages of the present invention will become apparent when reading the following detailed description taken in conjunction with the accompanying drawings, in which.

An embodiment of the waveform correction circuit suitably used with the dynamic convergence device according to the present invention will be explained below with reference to FIG. 6.

Figure 6:
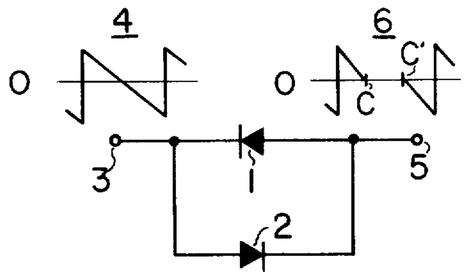
FIG. 6 is a diagram showing an embodiment of the waveform correction circuit used with the dynamic convergence device according to the present invention.
Figure 7:
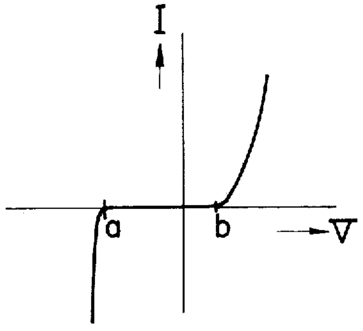
FIG. 7 is a graph showing a characteristics curve for explaining the circuit of FIG. 6.

In FIG. 6, reference numerals 1 and 2 show diodes. The characteristics curve of these diodes is illustrated in FIG. 7 in which the abscissa represents the voltage V applied to the terminals of the diodes 1 and 2, while the ordinate represents the current I flowing in the diodes 1 and 2. As will be apparent from the graph of FIG. 7, the diodes 1 and 2 have a dead zone between points *a* and *b* of FIG. 7.

Figure 1:
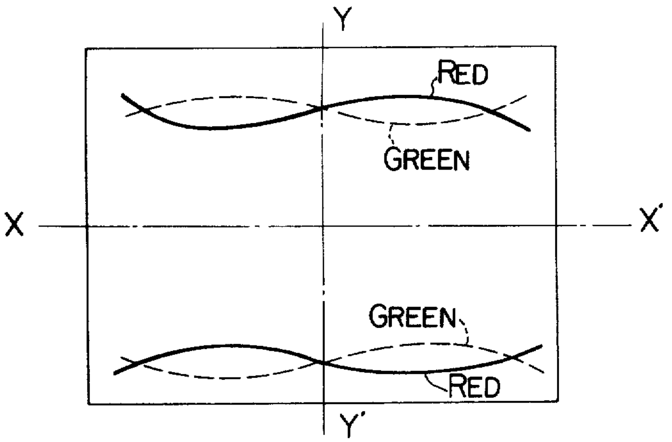
FIG. 1 is a front view of the screen of the television receiver showing residual misconvergence which occurs when the conventional dynamic convergence device is used.
Figure 2:
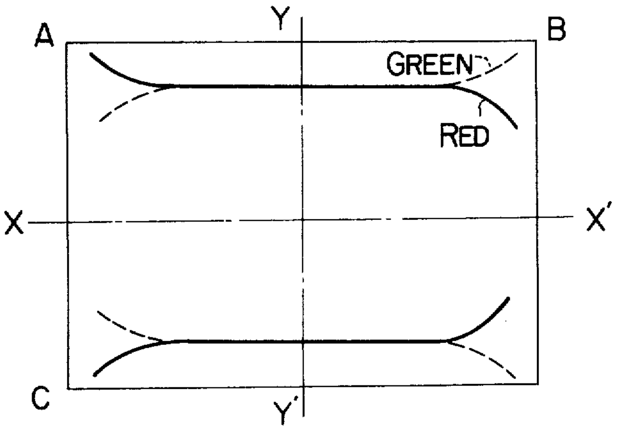
FIG. 2 is a front view of the screen of the television receiver showing residual misconvergence which occurs when the conventional dynamic convergence device is used with the television receiver incorporating a deflection yoke with a different magnetic field.
Figure 3:
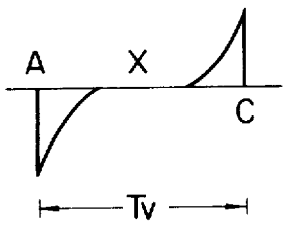
FIGS. 3 and 4 are diagrams showing waveforms of correction current required to correct the residual misconvergence shown in FIG. 2.
Figure 4:
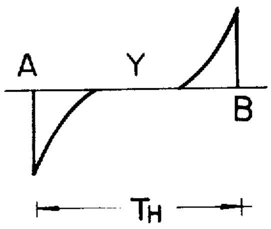

Upon application of the saw-tooth wave voltage 4 to the input terminal 3 of the circuit shown in FIG. 6, the saw-tooth voltage 6 with the dead zone between points *c* and *c'* is produced from the output terminal 5. In other words, by employing the waveform correction circuit of FIG. 6, the saw-tooth wave with the dead zones as shown in FIGS. 3 and 4 is obtained from the saw-tooth waveforms for vertical and horizontal cycles.

Figure 5:
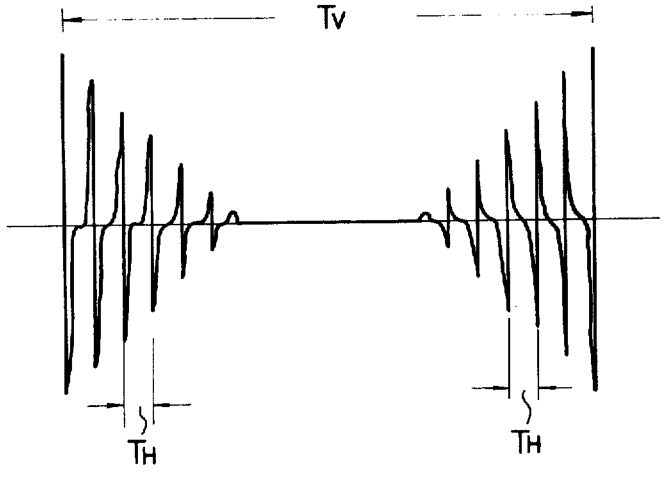
FIG. 5 is a diagram showing a waveform of output current or voltage produced from the balanced modulator in response to the current or voltage applied thereto.

Thus, the saw-tooth wave for horizontal cycles is transformed into a saw-tooth wave with a dead zone by the first waveform correction circuit and then it is applied to the first input terminal of the balanced modulator, whereas the saw-tooth wave for vertical cycles is transformed into a saw-tooth wave with a dead zone by the second waveform correction circuit and then it is applied to the second input terminal of the balanced modulator, with the result that a desired correction current or voltage as shown in FIG. 5 is obtained.

Explanation will be made now of an embodiment of the dynamic convergence device according to the present invention with reference to FIG. 8.

Figure 8:
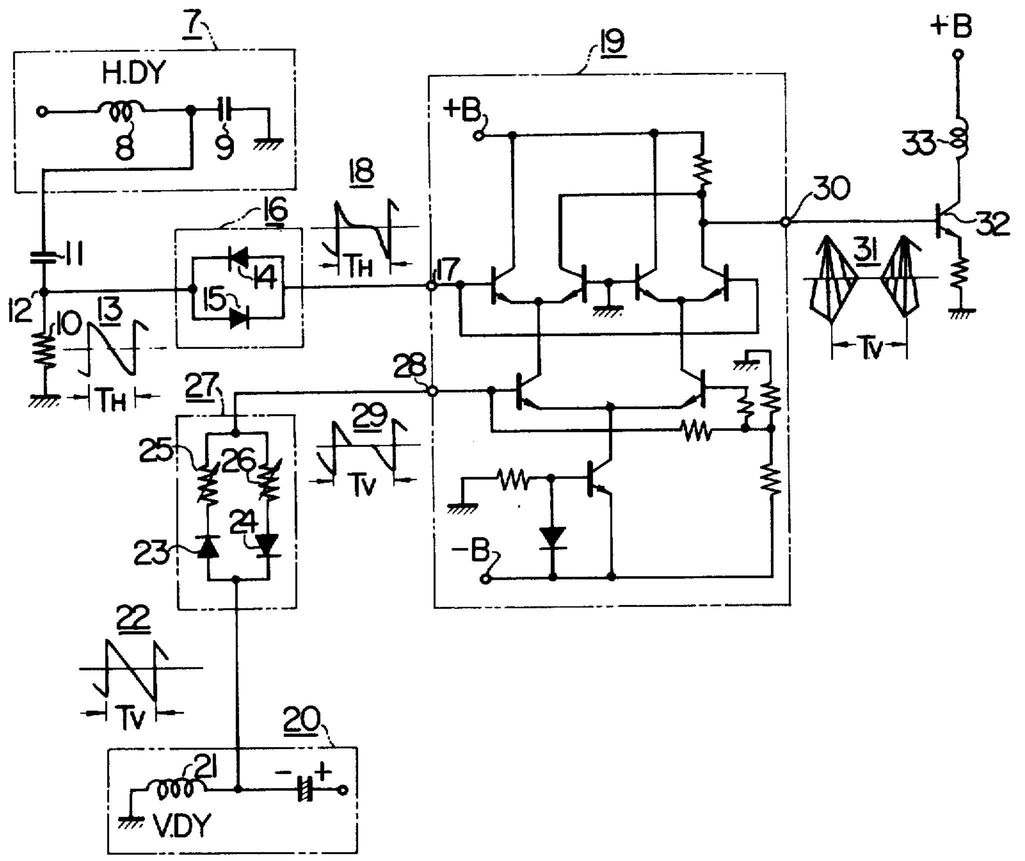
FIG. 8 is a circuit diagram showing an embodiment of the dynamic convergence device according to the present invention.

In FIG. 8, reference numeral 7 shows a horizontal deflection circuit in which parabola current taken from between the earth and the junction point between the deflection coil 8 and an S-shape correction capacitor 9 is differentiated by the differentiation circuit comprising a resistor 10 and a capacitor 11, so that the saw-tooth voltage 13 for horizontal cycles is produced from the output terminal 12.

The saw-tooth wave voltage 13 is supplied to the first waveform correction circuit 16 comprising the diodes 14 and 15, whereby the waveform of the saw-tooth voltage 13 is corrected, so that a saw-tooth voltage 18 with a dead zone is taken out at the output terminal of the first waveform correction circuit 16. The saw-tooth voltage 18 with a dead zone is applied to the first input terminal 17 of the balanced modulator 19.

A saw-tooth voltage 22 for vertical cycles which is generated across the vertical deflection coil 21 of a vertical deflection circuit 20 is applied to the second waveform correction circuit 27 comprising the diodes 23 and 24 and the variable resistors 25 and 26. The saw-tooth voltage 22 for vertical cycles is applied to the second waveform correction circuit 27 which produces at its output terminal a saw-tooth voltage 29 with a dead zone that is the result of correction of the waveform of the saw-tooth voltage 22 in the second waveform correction circuit 27. This voltage 29 is applied to the second input terminal 28 of the balanced modulator 19, whereby the saw-tooth voltage 18 for horizontal cycles is modulated by the saw-tooth voltage 29 for vertical cycles, so that the balanced modulator 19 produces at its output terminal 30 the voltage 31, that is, the voltage with the waveform as shown in FIG. 5. This voltage is applied to the base of the amplifier transistor 32, so that the current with the waveform shown in FIG. 5 is supplied to the dynamic convergence coil 33 (which may comprise the horizontal or vertical convergence coil for correction at four corners or may be separately provided), with the result that the curve of red beam is corrected. In order to correct the distortion of green beam, on the other hand, the same circuit as that shown in FIG. 8 is used in such a manner that voltages with their phases different from the saw-tooth voltages 13 and 22 by 180° are supplied to the first and second waveform correction circuits 16 and 27 respectively.

Incidentally, the variable resistors 25 and 26 in FIG. 8 are provided for the purpose of adjusting the width of the dead zone of the saw-tooth voltage 29. In other words, the adjustment of the variable resistors 25 and 26 causes the conduction periods of the diodes 23 and 24 to change in response to the resistance values of the resistors 25 and 26, and therefore the upper and lower sides of the screen can be adjusted independently of each other.

The variable resistors may be connected in series with the diodes 14 and 15, in which case the degree of adjustment at the right and left sides of the screen can be changed independently.

Although each of the first and second waveform correction circuits 16 and 27 includes a couple of diodes connected in parallel in opposite directions, they may be replaced by a couple of diode groups connected in parallel, each group including two or more diodes connected in series, in such a manner that the directions of conduction of the two diode groups connected in parallel are opposite to each other.

What we claim is:

1. A dynamic convergence correction device comprising a first generator for generating a saw-tooth voltage for horizontal cycles, a second generator for generating a saw-tooth voltage for vertical cycles, first and second waveform correction circuits for respectively cutting off voltages in the respective predetermined ranges and passing the other voltages to convert the saw-tooth voltages for horizontal and vertical cycles into the respective waveforms each having a dead zone, a balanced modulator having first and second input terminals and an output terminal, means for connecting said first generator to said first input terminal of said balanced modulator through said first waveform correction circuit to supply to said first input terminal of said balanced modulator the saw-tooth voltage for horizontal cycles having a dead zone, means for connecting said second generator to said second input terminal of said balanced modulator through said second waveform correction circuit to supply to said second input terminal of said balanced modulator the saw-tooth voltage for vertical cycles having a dead zone, and means for drawing out from said output terminal of said balanced modulator an output in which the saw-tooth voltage for horizontal cycles having a dead zone is modulated by the saw-tooth voltage for vertical cycles having a dead zone.

2. A dynamic convergence correction device according to claim 1, in which each of said first and second waveform correction circuits comprises a circuit including a couple of diodes connected in parallel in opposite polarities.

3. A dynamic convergence circuit according to claim 1, in which each of said first and second waveform correction circuits comprises a circuit including a couple of diode groups connected in parallel in opposite polarities, each of said groups having at least two diodes connected in series.

4. A dynamic convergence correction device comprising a first generator for generating a saw-tooth voltage for horizontal cycles, a second generator for generating a saw-tooth voltage for vertical cycles, first and second waveform correction circuits for respectively cutting off voltages in the respective predetermined ranges and passing the other voltages to convert the saw-tooth voltages for horizontal and vertical cycles into the respective waveforms each having a dead zone, a balanced modulator having first and second input terminals and an output terminal, means for connecting said first generator to said first input terminal of said balanced modulator through said first waveform correction circuit to supply to said first input terminal of said balanced modulator the saw-tooth voltage for horizontal cycles having a dead zone, means for connecting said second generator to said second input terminal of said balanced modulator through said second waveform correction circuit to supply to said second input terminal of said balanced modulator the saw-tooth voltage for vertical cycles having a dead zone, means for drawing out from said output terminal of said balanced modulator an output voltage in which the saw-tooth voltage for horizontal cycles having a dead zone is modulated by the saw-tooth voltage for vertical cycles having a dead zone, and means for supplying the output voltage of said balanced modulator to the input terminal of an amplifier to supply a correction current to a convergence coil connected to the output terminal of said amplifier.

5. A dynamic convergence correction device comprising a first generator for generating a saw-tooth voltage for horizontal cycles, a second generator for generating a saw-tooth voltage for vertical cycles, a first waveform correction circuit including at least a couple of diodes connected in parallel in opposite polarities, a second waveform correction circuit including at least a couple of diodes connected in parallel in opposite polarities, a balanced modulator having first and second input terminals and an output terminal, means for connecting said first generator to said first input terminal of said balanced modulator through said first waveform correction circuit to supply to said first input terminal of said balanced modulator the saw-tooth voltage for horizontal cycles having a dead zone, means for connecting said second generator to said second input terminal of said balanced modulator through said second waveform correction circuit to supply to said second input terminal of said balanced modulator the saw-tooth voltage for vertical cycles having a dead zone, means for drawing out from said output terminal of said balanced modulator an output voltage in which the saw-tooth voltage for horizontal cycles having a dead zone is modulated by the saw-tooth voltage for vertical cycles having a dead zone, a transistor amplifier, a convergence coil connected between the output terminal of said transistor amplifier and a power supply, means for supplying the output voltage of said balanced modulator to the input terminal of said transistor amplifier, and means for supplying to said convergence coil the current with the same waveform as the output voltage of said balanced modulator.

6. A dynamic convergence correction device according to claim 5, in which a variable resistor is connected in series to each of said diodes included in said first waveform correction circuit.

7. A dynamic convergence correction device according to claim 5, in which a variable resistor is connected in series to each of said diodes included in said second waveform correction circuit.

* * * * *